C. F. ULRICH.
LAMP FOR MOTOR VEHICLES.
APPLICATION FILED DEC. 1, 1915.

1,205,824.

Patented Nov. 21, 1916.

Witnesses

Inventor
C. F. Ulrich,
By Victor J. Evans
Attorney

UNITED STATES PATENT OFFICE.

CHARLES F. ULRICH, OF HOLBROOK, NEW YORK.

LAMP FOR MOTOR-VEHICLES.

1,205,824.  Specification of Letters Patent.  Patented Nov. 21, 1916.

Application filed December 1, 1915.   Serial No. 64,481.

*To all whom it may concern:*

Be it known that I, CHARLES F. ULRICH, a citizen of the United States, residing at Holbrook, in the county of Suffolk and State of New York, have invented new and useful Improvements in Lamps for Motor-Vehicles, of which the following is a specification.

This invention relates to improvements in lamps for motor vehicles and has particular application to a lamp for use on the rear end of a vehicle to facilitate backing of the vehicle.

In carrying out the present invention, it is my purpose to provide a lamp which will be under the control of the reverse lever of the vehicle and which will be carried by the rear end of the vehicle so that when the vehicle is being reversed or moved backward, the path will be illuminated so as to avoid accidents.

It is also my purpose to provide a lamp of the class described which may be readily and conveniently installed on any automobile and which will operate efficiently and effectively for its intended purpose.

With the above and other objects in view, the invention consists in the construction, combination and arrangement of parts hereinafter set forth in and falling within the scope of the claim.

Figure 1:
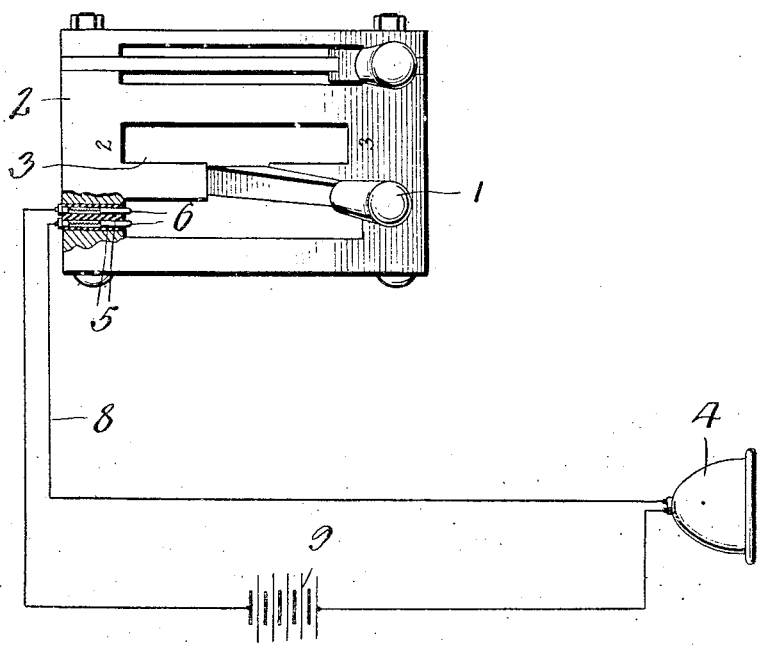
Figure 2:
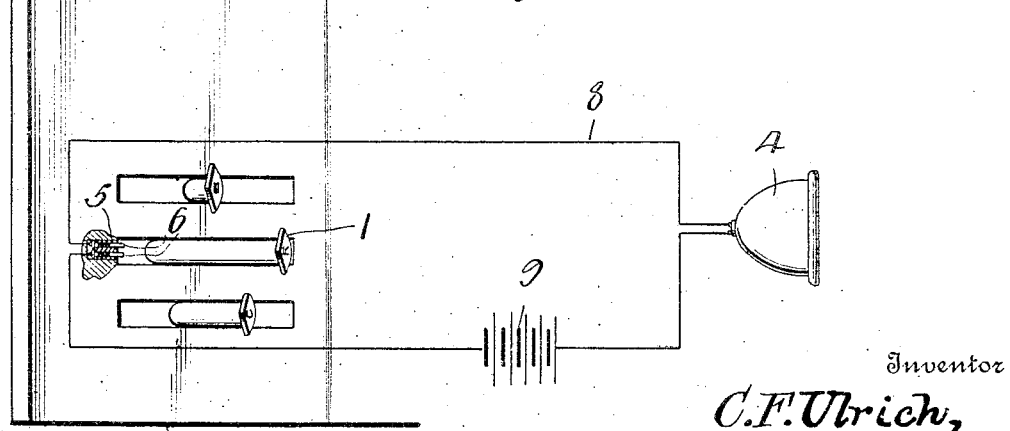

In the accompanying drawing: Figure 1 is a perspective view, partly diagrammatic, of a lamp and gear shift lever, showing the circuit connections between the lever and the lamp. Fig. 2 is a similar view showing the lamp as connected in circuit with a reversing pedal in contradistinction to a lever.

Referring now to the drawings in detail, 1 designates a gear shifting lever, while 2 indicates the usual plate formed with an H-slot 3 within which the lever 1 is movable to shift the gears to bring about the various speeds. Arranged upon the rear end of the vehicle is an electric lamp 4 of any suitable construction. Formed in the end of the H-slot 3 at the "reverse position" of the lever 1 are bores 5 and slidably mounted within these bores and insulated from each other are spring actuated pins 6 disposed in the path of movement of the lever 1 and adapted to be engaged and bridged by such lever and these pins 6 are connected with the respective terminals of an electric circuit 8 including a suitable source of electrical energy as a battery 9. In the modified form of the invention illustrated in Fig. 2, I have shown my device as installed in a vehicle wherein the reverse is effected through the medium of a pedal and in the end wall of the pedal slot corresponding to the active position of the pedal are bores that receive the pins and these pins are connected in circuit with the lamp and disposed in the path of movement of the pedal so as to be engaged and bridged by such pedal.

In practice, when it is desired to reverse the vehicle, the lever or pedal, as the case may be, is shifted to "reverse position", thereby engaging and bridging the spring pressed pins with the effect to close the circuit 8 and so illuminate the lamp 4, the lamp 4 projecting the rays of light behind the vehicle so as to facilitate the reversing thereof.

I claim:

A circuit maker and breaker comprising a base member and a control lever operable therein, spring actuated terminal pins arranged in the base member and adapted to be electrically bridged by said control lever in one of its operable positions.

In testimony whereof I affix my signature in presence of two witnesses.

CHARLES F. ULRICH.

Witnesses:
 D. RICHARD WULFERT,
 JOHN J. YERK.